(12) United States Patent
Ohta (10) Patent No.: US 8,107,098 B2
(45) Date of Patent: Jan. 31, 2012

(54) APPARATUS FOR CONTROLLING PRINTING, METHOD FOR THE SAME, PRINTING SYSTEM, AND COMPUTER PROGRAM

(75) Inventor: Satoshi Ohta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1245 days.

(21) Appl. No.: 10/996,009

(22) Filed: Nov. 23, 2004

(65) Prior Publication Data

US 2005/0141034 A1    Jun. 30, 2005

(30) Foreign Application Priority Data

Nov. 28, 2003  (JP) .................. 2003-400745

(51) Int. Cl.
*G06F 15/00*  (2006.01)
(52) U.S. Cl. .................. 358/1.14; 358/1.12; 358/1.15; 358/1.18; 715/255
(58) Field of Classification Search .................. 358/1.14, 358/1.12, 1.15, 1.18; 715/255
See application file for complete search history.

(56) References Cited

U.S. PATENT DOCUMENTS

| | | | |
|---|---|---|---|
| 6,373,588 B1 * | 4/2002 | Fischer et al. ............... | 358/1.16 |
| 6,666,594 B2 * | 12/2003 | Parry ............................... | 400/74 |
| 6,667,816 B1 * | 12/2003 | Van Buren et al. .......... | 358/3.13 |
| 6,678,067 B1 * | 1/2004 | Reda et al. .................... | 358/1.14 |
| 7,069,501 B2 * | 6/2006 | Kunitake et al. .............. | 715/234 |
| 7,271,924 B1 * | 9/2007 | Takamizawa et al. ........ | 358/1.14 |
| 2004/0095595 A1 * | 5/2004 | Jacobsen ...................... | 358/1.14 |
| 2004/0114157 A1 * | 6/2004 | Linder et al. .................. | 358/1.9 |
| 2005/0102362 A1 * | 5/2005 | Price et al. .................... | 709/206 |

FOREIGN PATENT DOCUMENTS

JP        07-0072990      3/1995

* cited by examiner

*Primary Examiner* — Mark K Zimmerman
*Assistant Examiner* — Mark Milia
(74) *Attorney, Agent, or Firm* — Canon USA Inc. IP Divison (57) ABSTRACT

An apparatus for controlling printing allows the user to realize the occurrence of an error in real time and reliably notifies the system administrator of details output in an error information page. When the processing is stopped due to an error while print data is being created, the apparatus reads the details of an error definition form, which is defined in advance, creates the error information page, to which instructions to shift to an offline state are add if needed, and adds the error information page to the print data. A printer analyzes the print data. If the instructions are received to shift to the offline state, the printer shifts to the offline state. The user presses an online button so that the printer in the offline state outputs the error information page.

5 Claims, 6 Drawing Sheets

| OFF-LINE PROCESS: | ON |
| --- | --- |
| RETURN TO ON-LINE: | AUTOMATIC |
| RETURN TIME: | 60 |
| PANEL MESSAGE: | ERROR OCCURS; ON-LINE KEY IS PRESSED. |
| PRINTING REQUEST 1: | |
| PRINTING REQUEST 2: | |
| PRINTING REQUEST 3: | |
| PRINTING REQUEST 4: | |
| PRINTING REQUEST 5: | |
| ERROR NUMBER: | |
| ERROR LINE: | |
| ERROR FILE: | |

FIG. 7

| NUMBER OF PRINT FORMS |
|---|
| PRINT FORM 1 |
| PRINT FORM 2 |
| ERROR DEFINITION FORM |

| OFF-LINE PROCESS | ON |
|---|---|
| OFF-LINE TYPE | AUTOMATIC/MANUAL |
| RETURN TIME | |
| PANEL MESSAGE | |

APPARATUS FOR CONTROLLING PRINTING, METHOD FOR THE SAME, PRINTING SYSTEM, AND COMPUTER PROGRAM

BACKGROUND OF THE INVENTION

1. Field of the Invention

The present invention relates to apparatuses and methods for controlling printing and computer programs. In particular, the present invention relates to an apparatus and method for controlling printing, a printing system, and a computer program that directly performs printing on a printing device from a web server.

2. Description of the Related Art

In a printing system comprising a personal computer (PC) and a printer, executing a printer driver for controlling a print process (a program for controlling printing) on the PC transmits print data from the program to the printer and instructs the printer to print the data. If the processing of the print data is stopped due to an error, the program typically transmits error information to the printer by attaching it to the print data (see, for example, Japanese Patent Laid-Open No. H07-72990).

Such error information typically includes information indicating details of printing requests, error numbers, error locations, and files associated with errors. The printer outputs the received print data and the received error information. The above process is performed by, for example, outputting a trace dump in a PostScript printer or outputting error histories in a facsimile.

In the trace dump outputting, the error information is output after the print data that was originally requested is output. Therefore, a user who requests printing does not realize the occurrence of an error until the user receives print matter that is fully output. This operational flow applies to the outputting of error histories in a facsimile. There is a problem in that, since the user does not realize an error has occurred, it is difficult for the user to deal with the error promptly.

In known printing systems, there is also a problem in that it is difficult to determine whether the error information is inserted into a plurality of output print data sets.

To avoid these problems, in a situation where print data is created, when an error occurs, a method of simultaneously displaying the error information with warning dialogues and a method of notifying the user of the occurrence of the error by e-mail are known. However, in a printing system in which printing is directly performed from a web server in an intranet or the Internet by the use of the Internet Printing Protocol (IPP), a client, who makes a printing request, and a web server that receives the request and creates print data, operate in an asynchronous fashion. Therefore, there is a problem in that it is difficult to notify the user of the error information in real time. There is also a problem in that notification by e-mail lacks synchronism.

SUMMARY OF THE INVENTION

The present invention aims to solve the above problems. The present invention provides an apparatus and method for controlling printing, a printing system, and a computer program that are capable of informing a user of the occurrence of an error in a printing process in real time and of reliably notifying a system administrator of the details output in an error information page.

According to an aspect of the present invention, an apparatus for controlling printing transmits a document print job to a printing device being in the online state. The apparatus includes: a print data creating unit for creating a second print data set for performing overlay processing based on a document form and a first print data set; a retrieving unit for retrieving error information on an error when the error occurs while the document print job is being created; an error information page creating unit for creating an error information page containing the error information retrieved by the retrieving unit and instructions to shift the printing device to an offline state; an adding unit for creating a third print data set by adding the error information page created by the error information page creating unit to the second print data set; and a transmitting unit for transmitting the third print data set created by the adding unit as the document print job to the printing device.

According to the present invention, the error information for the occurrence of an error in a print data creating process is added to the end of the print data set that is correctly output as an error information page, which is dedicated to the error information. Moreover, for outputting the error information page, the printer is shifted to the offline state and, upon the user switching to the online state, the error information page is output, so that the user can be informed of the occurrence of an error in real time.

The system administrator is notified of the details output in the error information page so that reliable recovery from errors is achieved.

Other features and advantages of the present invention will be apparent from the following description taken in conjunction with the accompanying drawings, in which like reference characters designate the same or similar parts throughout the figures thereof.

DESCRIPTION OF THE EMBODIMENTS

Embodiments of the present invention will be described with reference to the drawings.

First Embodiment

In a first embodiment, a printing system includes a client computer system and a web print server, and both the client and the web print server are connected to a network or networks. In this printing system, the client makes a printing request to the web print server to print a document, and the web print server receives the request and sends document print data to a printer.

Figure 1A:
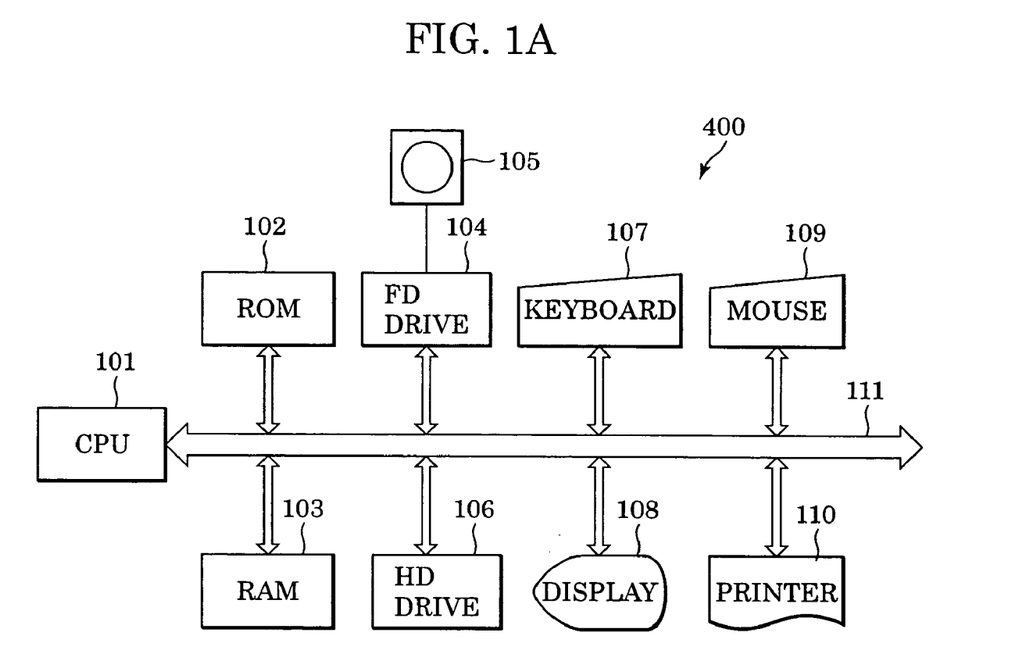
FIGS. 1A and 1B are block diagrams showing the hardware configuration of a computer system according to an embodiment of the present invention.
Figure 1B:
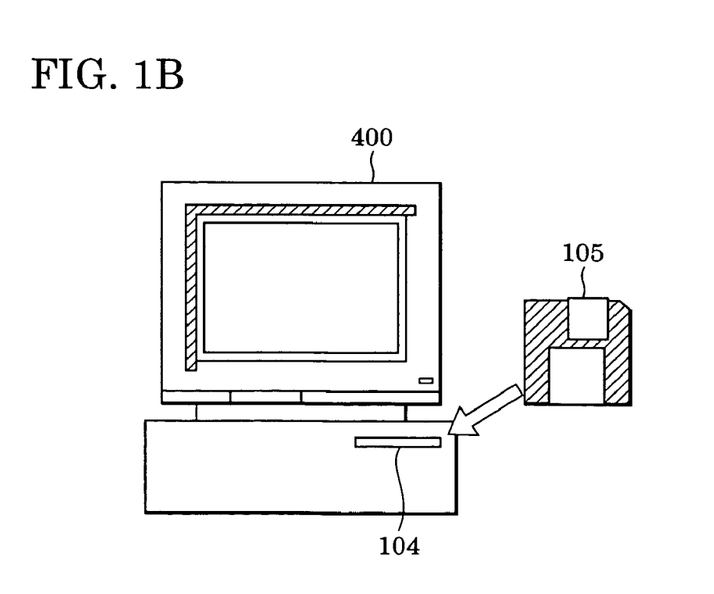

FIGS. 1A and 1B are block diagrams showing the hardware configuration of the computer system contained in the printing system according to this embodiment of the present invention.

A computer system 400 is essentially composed of: a central processing unit (CPU) 101; a main memory unit including a read-only memory (ROM) 102 and a random-access memory (RAM) 103; an external memory unit including a floppy disk (FD) drive 104, a hard disk (HD) drive 106, and the like; an input unit including, for example, a keyboard 107 and a pointing device, such as a mouse 109; a display unit including a display 108; a printing unit including a printer 110 and/or a plotter; and a system bus 111 connecting these units. The computer system 400 and other computer systems are connected to each other by network buses.

The computer system 400 operates by executing a basic I/O (input/output) program, an operating system (OS), and a control program by the CPU 101. The basic I/O program is stored in the ROM 102, and the OS is stored in a hard disk in the HD drive 106. When the power of the computer system 400 is turned on, the OS is loaded into the RAM 103 from the hard disk in the HD drive 106 by initial program loading (IPL) of the basic I/O program and the OS then starts running.

Figure 2:
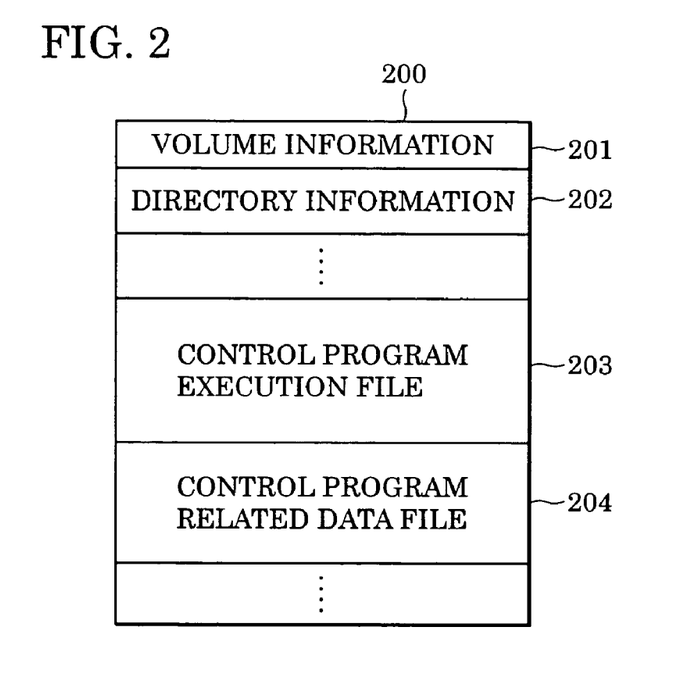
FIG. 2 shows a storage area of a storage medium on which a program according to the embodiment and the like are stored.

In this embodiment, the control program and related data are stored in an FD 105. FIG. 2 shows the contents of this data storage. A storage area 200 of the FD 105 contains an area 201 for volume information, an area 202 for directory information, an area 203 for a control program execution file, and an area 204 for a control program-related data file.

As shown in FIG. 1B, the control program execution file and the control program-related data file stored in the FD 105 can be loaded into the computer system 400 with the FD drive 104. When the FD 105 is placed in the FD drive 104, the control program and the related data are read out from the FD 105 under the control of the OS and the basic I/O program and then loaded into the RAM 103 so as to be made operable.

The control program and the related data may be stored in the hard disk or a compact disc (CD).

Figure 3:
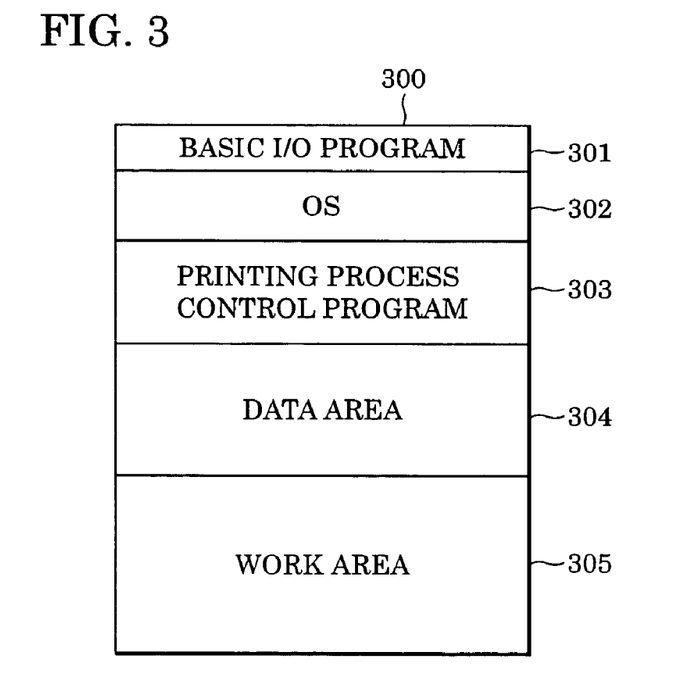
FIG. 3 shows a memory map when the program according to the embodiment is executed.

FIG. 3 shows a memory map when the control program is loaded into the RAM 103 so as to be made operable.

In a storage area 300 of the RAM 103, a basic I/O program 301, an OS 302, and a printing process control program 303 are stored, and a data area 304 and a work area 305 are assigned. The control program execution file in the FD 105 is stored in the printing process control program 303, whereas the control program-related data file is stored in the data area 304.

In this embodiment, the control program and the related data are loaded directly into the RAM 103 from the FD 105. It is possible to use the hard disk in the HD drive 106 shown in FIG. 1. In this case, the control program execution file and the control program-related data file read out from the FD 105 may be temporarily stored (installed) in the hard disk in the HD drive 106, and then, both may be loaded into the RAM 103 from the hard disk in the HD drive 106 when the control program is executed. Examples of media for storing the control program include a CD-ROM and a memory card, in addition to an FD. The control program may be stored in the ROM 102 so as to serve as a part of the memory map and be executed directly by the CPU 101.

Figure 4:
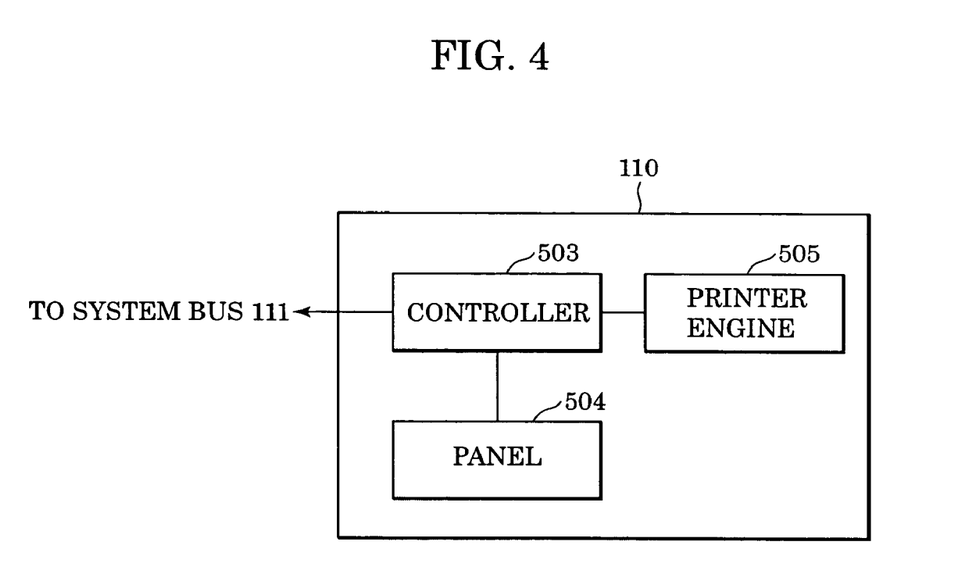
FIG. 4 is a block diagram illustrating functional units in a printer according to the embodiment.

FIG. 4 is a block diagram of the printer 110 included in the printing system according to this embodiment.

The printer 110 includes a controller 503, a panel 504, and a printer engine 505. The printer engine 505 generates a latent image on a photoconductor drum by a known electrophotography process on the basis of image data (binary data or multi-value data), and transfers it to a sheet of paper, and fuses it so as to print it. The panel 504 serves to interface with the user (operator) and is composed of a liquid crystal panel portion having a touch sensor (not shown) and a keyboard. The user can provide the printer 110 with instructions to perform a predetermined task by operating the panel 504.

The controller 503 controls the panel 504 and the printer engine 505 and exchanges data with an external unit group.

Figure 5A:
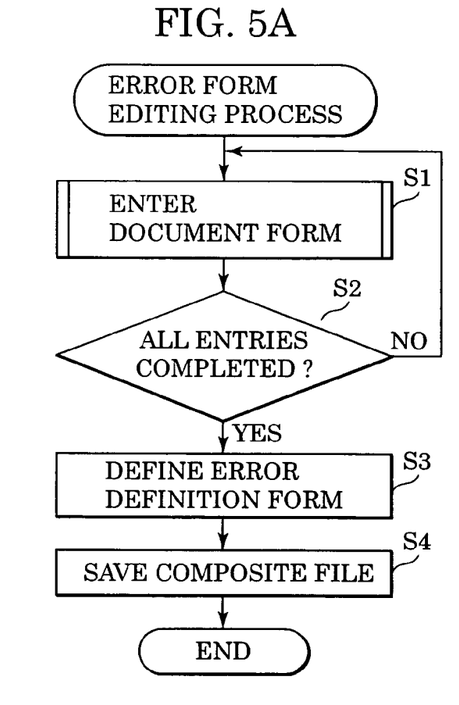
FIGS. 5A and 5B are flowcharts of operations of a method for controlling printing according to the embodiment.
Figure 5B:
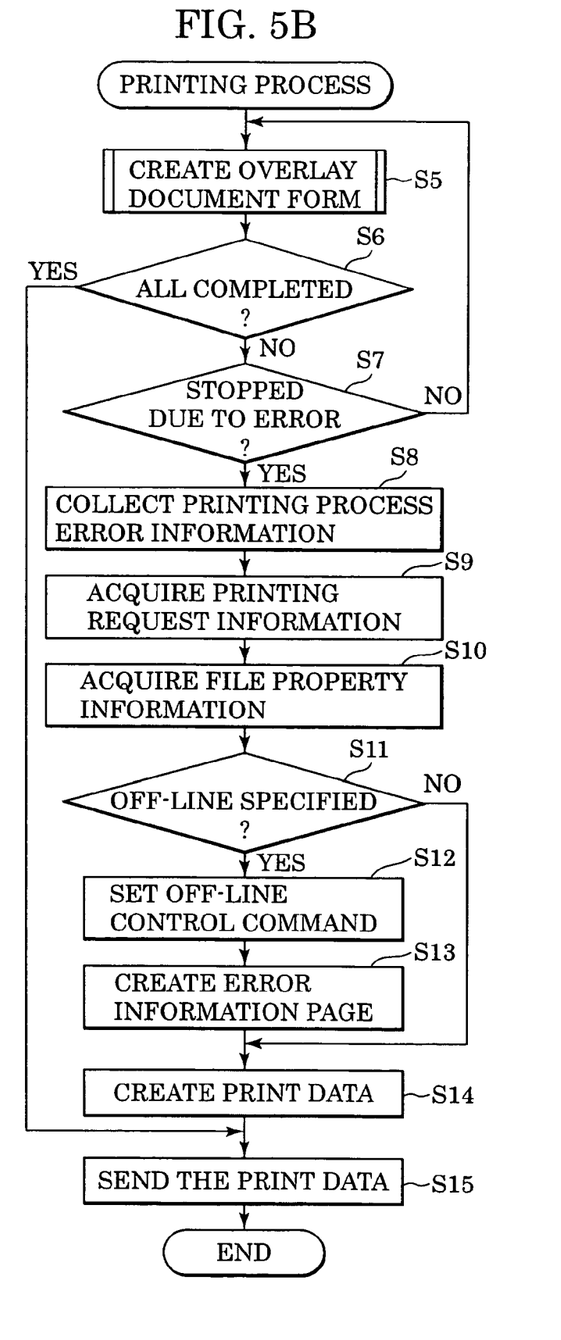

FIGS. 5A and 5B are flowcharts of operations of a method for controlling printing, the method being performed in the printing system according to this embodiment. With reference to FIGS. 5A and 5B, the operations in this embodiment will be separately described as an entry process and a printing process.

In the printing system, a composite document comprising a plurality of document forms and constituting a single print job is subjected to printing processing. For the entry process, the document forms are sequentially entered in page order, and an error definition form in which necessary items as error information and offline settings are defined is entered as the last page, and therefore, a composite document control file is created.

For the printing process, the document forms are sequentially read out from the composite document control file, and each form is combined with substantial print data so as to create an overlay document form. If an error occurs, an error information page is created based on the error definition form, error information, and instructions on offline settings. The error information page is added to the overlay document form that is correctly created.

The Entry Process

Firstly, in step S1 of FIG. 5A, the control program is executed in the web print server so as to enter a document form to be added to a print job. Secondly, in step S2, it is determined whether all entries are completed. If not, the processing returns to step S1 and continues entering document forms. This entry process may be replaced with an editing process in which a document form is edited in the web print server, or another entry process in which a document form is read out from a medium storing the document form, such as an FD, in order to enter it.

If it is determined in step S2 that all entries are completed, the processing moves to step S3. In step S3, the control program displays a predetermined dialogue used to define the error definition form on the display 108 so as to accept input from the user. The user inputs desired information in the dialogue using the keyboard 107 and/or the mouse 109 of the web print server so as to define a panel message, which is displayed on the panel of the printer when an error occurs, and whether the printer is shifted to the offline state when the error occurs. If selecting a shift to the offline state, the user defines a way to return to the online state. The user has the option of returning to the online state by manual operation return ("manual"), automatic return upon expiry of a designated time period ("automatic"), or the like. If the automatic return is selected, the user designates the time period (second(s)) (the time-out second(s) for automatic return).

In step S4, the settings of the document forms constituting the print job and the error definition form attached to the end of the document forms, both being prepared in the previous steps, are saved in the composite document control file.

The Printing Process

The printing operations of the composite document control file according to this embodiment are described next with reference to FIG. 5B.

In step S5, the web print server receives a printing request from the client. The printing request includes the designation (pathname) of print data, the user name, the type of document to be output, and the name of a target printer. The web print server retrieves a document form from the read composite document control file on a one-by-one basis and sequentially combines it with its designated print data so as to create print data in overlay document form. In step S6, it is determined whether the creation of print data in overlay document form with respect to all document forms has been completed. If so, processing moves to step S15.

If it is determined that the creation of print data in overlay document form with respect to all documents has not been completed, processing proceeds to step S7. In step S7, it is determined whether the creation of print data in overlay document form up to this step is completed correctly. If so, the processing returns to step S5, which executes the creation of print data in overlay document form with respect to the next document form. If it is determined that the processing has been stopped due to an error, error information, such as the type (number) of the error and a location of the error (line number in the document), in the printing process is collected in step S8. The collected error information is temporarily saved in the memory.

In step S9, the web print server temporarily saves the printing request (the user name, the type of document to be output, and the target printer name) received from the client in the memory, as in step S8.

In step S10, file property information required for printing the document, such as the pathname for the print data, the creation time, and attributes of write and read, is retrieved from the printing request, which is temporarily saved. The retrieved file property information is temporarily saved in the memory, as in step S8.

In step S11, the details of the error definition form of the composite document control file are read in order to determine whether instructions to shift to the offline state are selected. If not, processing moves to step S14. If so, in step S12, an offline shifting command for forcibly shifting the printer to the offline state is edited based on the offline settings (manual/automatic for return, time-out second(s) for automatic return, and a panel message) shown in FIG. 6.

Figure 6:
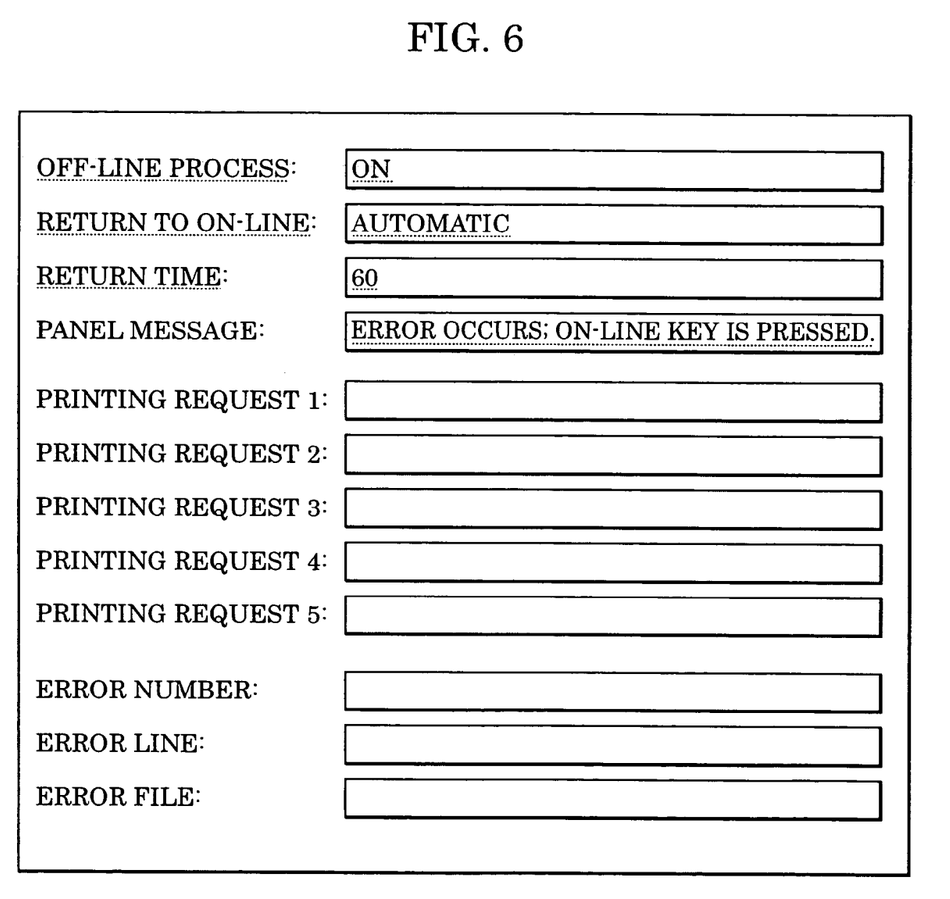
FIG. 6 shows a typical error information page according to the embodiment.

In step S13, an error information page is created based on the error information saved in the memory in steps S8 to S10 and the offline shifting command in accordance with the format shown in FIG. 6. This creation process is overlay processing using forms and print data, as in the case of the creation process in step S5.

Subsequent to the correct output of the overlay document forms, which are created by repeating the processing of step S5, the error information page created in step S13 is added so as to constitute a single print data set (composite form definition file) (step S14). The created composite form definition file is transmitted directly to the printer from the print server by, for example, the use of the IPP (step S15). The transmitted print data set is analyzed in the controller of the printer, and the printer is forcibly shifted to the offline state when the offline shifting command is detected and, at the same time, the strings that are designated in the error definition form appear on the panel as a panel message. When the printer is shifted to the offline state, a beeping sound is usually produced at the same time. When the printer is in the offline state, the user views the panel message and then presses an online button and the error information page is output. Therefore, the user can realize that the printing process based on the request from the server has been stopped due to an error. In the case in which the automatic return to the online state is selected, the printer in the offline state is automatically returned to the online state in a predetermined period and the error information page is output. This is effective when a user who requests printing has to leave the printer. If instructions to shift to the offline state are not contained, the error information page is output subsequently to the print data that is correctly output, as in a general printing process.

FIG. 6 shows a typical format of the error information page to be output. The format shown in FIG. 6 includes the following definitions: ON or OFF option for the offline process; automatic or manual option for the return to online; in the case of the automatic return, return time (second(s)); and a panel message when the printer is shifted to the offline state (desired strings suitable for display on the panel). The user can see this error information page, so that the user can view the details of the definitions. In FIG. 6, the following items are defined as fixed data on the error definition form: "ON" in the offline process; "automatic" in the return to online; "60" in the return time; and "error occurs; on-line key is pressed." in the panel message. These items, printing requests one to five, an error number, an error line, and an error file serve as a data file in printing the error definition form.

Figure 7:
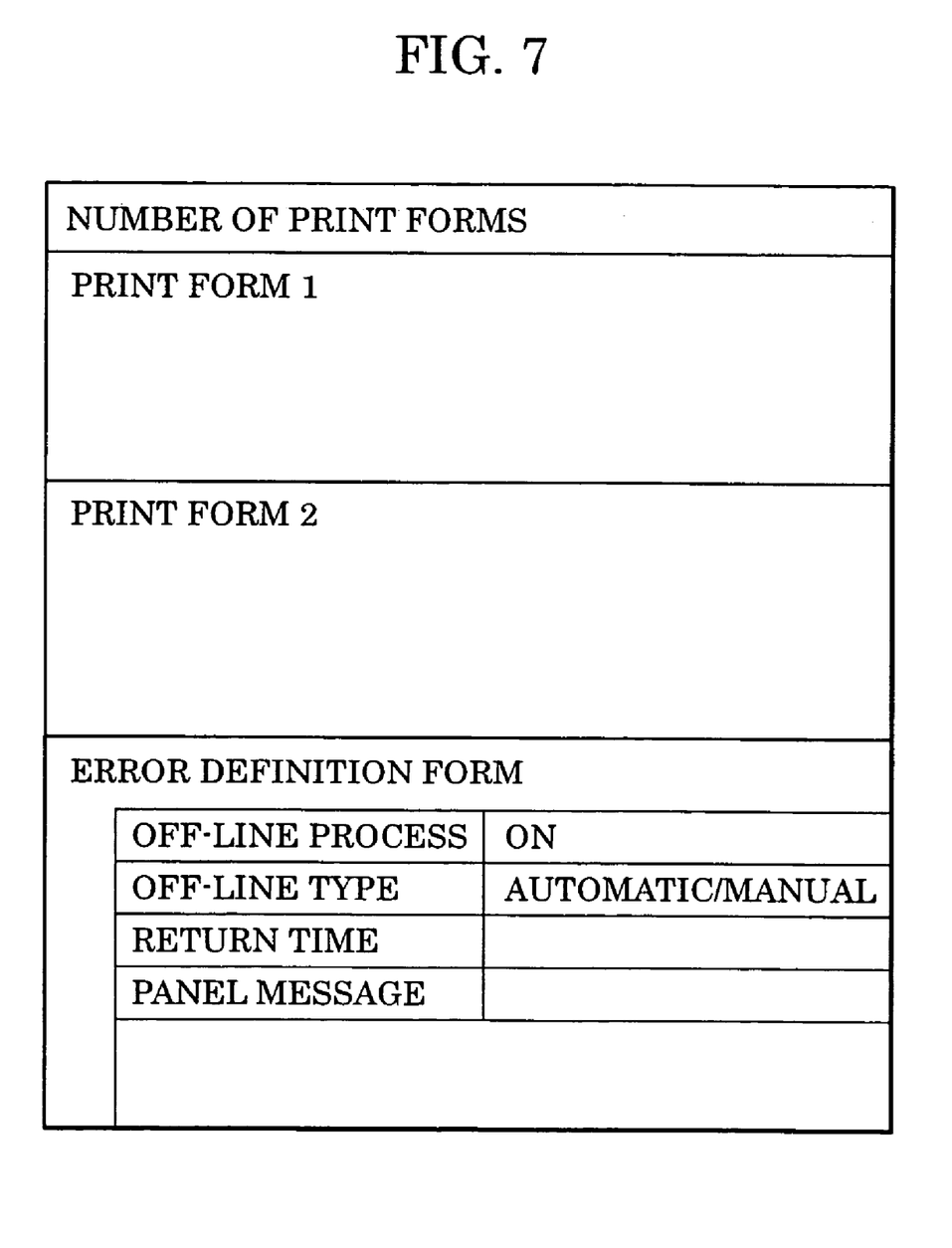
FIG. 7 shows a typical composite form definition file according to the embodiment.

FIG. 7 shows a typical format of the composite document control file. In FIG. 7, each document form is assigned to each block in the composite document control file, except that the error definition form is assigned to the last block.

Second Embodiment

In the first embodiment, the document forms constituting the print job, and the error definition form are combined into the single composite form definition file, and this composite form definition file is printed. In a second embodiment of the present invention, a printer driver installed in the client is used to perform the settings.

In this case, the client displays a property dialogue for the offline settings, which corresponds to the error definition form, on the basis of execution of the printer driver, and selects the type of shift to the offline state in accordance with input from the user. Since the error information items vary among applications, defining them may be omitted. If an error occurs in the printing process executed by an application in the client, an offline shifting command is generated when printing application programming interface (API) AbortDoc for aborting printing is performed, and the command is added to print data. The print data is then sent to the printer via the web print server.

According to this embodiment, the printer driver controls the processing when an error occurs, and therefore, a dedicated composite form definition file is not necessary. The printer can be shifted to the offline state with respect to printing from any application. As a result, application-independent error handling is achieved.

Third Embodiment

In the above embodiments, the web print server saves the error definition form and creates the error information page when an error occurs. The error definition form may be held in the printer. In this case, the printer stores the error definition form in a storage device (not shown). When an error occurs in the printing process, the error is analyzed. The results are sent to the error definition form to create the error information page, and the created error information page is added to the end of the print data.

Fourth Embodiment

The error definition form may include information about the type of printing paper, in addition to the instructions to shift to the offline state. For example, when the printer has a plurality of paper trays, one paper tray is dedicated to error information printing and holds a different type of (e.g., red) paper. For setting the error definition form in the web print server, the paper tray dedicated to the error information is designated as a target paper tray for printing the error information page. Therefore, when a plurality of documents are printed in a setting in which automatic return to the online state after an error occurs is selected, the user can readily find a printing error from among the plurality of documents.

As many apparently widely different embodiments of the present invention can be made without departing from the spirit and scope thereof, it is to be understood that the invention is not limited to the specific embodiments thereof except as defined in the appended claims.

This application claims priority from Japanese Patent Application No. 2003-400745 filed Nov. 28, 2003, which is hereby incorporated by reference herein.

What is claimed is:

1. An apparatus for transmitting a print job to a printing device, the apparatus comprising:
   a register unit configured to register a document form and an error definition form including a user-definable message indicating an operation method to change a state of the printing device to an online state to perform printing processing from an offline state to not perform the printing processing, and user-definable paper tray information indicating an error paper tray in which a paper to print a content of an error is set;
   a merge unit configured to create merged print data merging the document form and print data for performing overlay printing;
   a reading unit configured to read the error definition form when an error occurs while the merged print data is created;
   a first creation unit configured to create error information based on content of the occurred error, the user-definable message and the user-definable paper tray information to be included in the error definition form read by the reading unit;
   a second creation unit configured to create the print job based on the merged print data created by the merge unit and the error information created by the first creation unit such that the merged print data created by the merge unit is printed first, the user-definable message included in the error information is displayed on the printing device following printing processing of the merged print data, the content of the occurred error is printed on the paper different from a paper for the merged print data set in the error paper tray in accordance with receiving the operation indicated by the user-definable message following display processing of the user-definable message; and
   a transmitting unit configured to transmit the print job created by the second creation unit to the printing device.

2. The apparatus according to claim 1, wherein the content of the error includes information indicating details of a printing request to the printing device, a number of the error, and a location of the error.

3. A method for transmitting a print job to a printing device, the method comprising:
   registering a document form and an error definition form including a user-definable message indicating an operation method to change a state of the printing device to an online state to perform printing processing from an offline state to not perform the printing processing, and user-definable paper tray information indicating an error paper tray in which a paper to print a content of an error is set;
   creating merged print data by merging the document form and print data for performing overlay printing;
   reading the error definition form when an error occurs while the merged print data is created;
   creating error information based on content of the occurred error, the user-definable message and the user-definable paper tray information to be included in the read error definition form;
   creating the print job based on the merged print data and the error information such that the merged print data is printed first, the user-definable message included in the error information is displayed on the printing device following printing processing of the merged print data, the content of the occurred error is printed on the paper different from a paper for the merged print data set in the error paper tray in accordance with receiving the operation indicated by the user-definable message following display processing of the user-definable message; and
   transmitting the created print job to the printing device.

4. The method according to claim 3, wherein the content of the error includes information indicating details of a printing request to the printing device, a number of the error, and a location of the error.

5. A non-transitory computer-readable medium having stored thereon a program for controlling printing according to the method of claim 3.

* * * * *